United States Patent
Sakamoto et al.

(10) Patent No.: US 6,290,884 B1
(45) Date of Patent: Sep. 18, 2001

(54) PROCESS FOR PRODUCING UNCROSSLINKED POLYPROPYLENE-BASED RESIN FOAM SHEETS AND UNCROSSLINKED POLYPROPYLENE-BASED RESIN FOAM SHEETS

(75) Inventors: Akinobu Sakamoto, Sodegaura; Tatsuhiro Nagamatsu, Ichihara, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/363,842

(22) Filed: Jul. 30, 1999

(30) Foreign Application Priority Data

Aug. 3, 1998 (JP) .................................................. 10-218951

(51) Int. Cl.$^7$ ........................................................ B28B 1/50
(52) U.S. Cl. ........................ 264/53; 425/4 R; 425/817 R; 521/79; 521/81; 521/142
(58) Field of Search ................................ 521/79, 81, 917, 521/142; 264/53; 425/4 R, 817 R

(56) References Cited

U.S. PATENT DOCUMENTS

| | | | |
|---|---|---|---|
| 5,744,505 | * | 4/1998 | Fischer et al. ........................ 521/79 |
| 5,817,705 | * | 10/1998 | Wilkes et al. ........................ 521/79 |
| 5,905,098 | * | 5/1999 | Wilkes et al. ........................ 521/79 |
| 6,005,013 | * | 12/1999 | Suh et al. ............................. 521/79 |

FOREIGN PATENT DOCUMENTS

| | | |
|---|---|---|
| 58-38128 | 3/1983 | (JP) . |
| 6-91725 | 4/1994 | (JP) . |
| 6-335952 | 12/1994 | (JP) . |
| 7-52224 | 2/1995 | (JP) . |

OTHER PUBLICATIONS

William T. Rice, "The Case for Gear Pumps: What's Behind the New Interest", *Plastics Technology*, Feb. 1980, pp. 87–91.

* cited by examiner

*Primary Examiner*—Morton Foelak
(74) *Attorney, Agent, or Firm*—Sughrue, Mion, Zinn, Macpeak & Seas, PLLC

(57) ABSTRACT

The present invention provides a process for producing uncrosslinked polypropylene-based resin foam sheets which is characterized by using an extrusion foaming apparatus having a gear pump which is interposed between the extruder and the die and which is linked by means of adapters, wherein the pressure (Pg) at the inlet of the gear pump is within the range specified by the following formula (Formula 1) and the extruder is controlled so that the value of Pg is constant.

Formula 1

$$Pc \leq Pg(atm) \leq Pc + 90$$

$$Pc = (\chi - 1)/H$$

$\chi$: theoretical expansion ratio when the foaming agent added is 100% held

H: coefficient of solubility of the foaming gas in the resin at the resin temperature in the gear pump inlet (cm$^3$(STP)/cm$^3$·atm) and the like.

The present invention makes it possible to produce uncrosslinked polypropylene-based resin foam sheets having fine foam cells and good appearance and being excellent in productivity and extrusion stability as well as in productivity improving effect in the production of high-expansion thin sheets with reducing wavy or corrugated defects at ends of sheets.

3 Claims, 1 Drawing Sheet

(i)

(ii)

PROCESS FOR PRODUCING UNCROSSLINKED POLYPROPYLENE-BASED RESIN FOAM SHEETS AND UNCROSSLINKED POLYPROPYLENE-BASED RESIN FOAM SHEETS

BACKGROUND OF THE INVENTION

1. Field of the Invention

The present invention relates to a process for producing uncrosslinked polypropylene-based resin foam sheets which have fine foam cells and good appearance. More specifically, the present invention relates to a process for producing uncrosslinked polypropylene-based resin foam sheets, characterized in that the productivity in the production of high-expansion thin sheets is remarkably increased.

2. Description of the Related Art

A technique, in which extrusion foaming is carried out by interposing a gear pump between an extruder and a die, has been hitherto applied to a process for producing polystyrene and is described in, for example, "Plastic Technology 28 [2] 87 (1980)".

The effects of using a gear pump in extrusion forming are as follows according to "Synthetic Resins 40 [9] 42 (1994)".
(1) Effects brought about by the suppression of pressure rise in the extruder
  reduction of energy consumption
  prevention of rise in resin temperature
  improvement of transfer efficiency (productivity)
  reduction of retention time in the extruder
  reduction of L/D of the extruder
(2) Influences of combination with die are eliminated.
  The setting of temperature, pressure, and revolution number of the extruder becomes easier.
  Irrespective of the shapes of die, the conditions set to the extruder do not need to be changed if the resin to be used and the production amount are unchanged.
  The difference of product qualities due to difference of the abilities of operators is eliminated.
  Unmanned operation and automated operation become possible.
(3) Stabilization in production
  The influence of pressure change in the extruder is eliminated.
  Even moistened raw materials can be used.
  Temperature distribution becomes nearly constant.
  Time required for the start up of production can be remarkably reduced.

However, all of the above-described effects are not necessarily obtained by using a gear pump because processing conditions suited for foaming vary depending on resins and because wavy or corrugated defects peculiar to foaming tend to occur at ends of sheets in the case of extrusion foaming.

In particular, in the case of an uncrosslinked polypropylene-based resin which is crystalline and whose viscosity sharply drops at a temperature higher than the melting point, it is impossible to produce high-expansion foam sheets having uniform fine foam cells by conventional extrusion foaming. Further, an attempt to increase delivery rate in order to increase productivity or to produce high-expansion foam sheets is associated with problems such as rise in resin pressure and temperature.

The loss due to wavy or corrugated defects at ends of sheets occurs when transverse expansion due to foaming is regulated by the width of die. This phenomenon is peculiar to foamed sheets, particularly a high-expansion foamed sheet by an expansion ratio of 2 or greater. In addition, the loss due to wavy or corrugated defects at ends of sheets occurs frequently when the resin temperature is high and the foaming gas tends to be leaked. Therefore, a need exists for means to reduce the above loss in the production of uncrosslinked polypropylene-based resin foam sheets.

SUMMARY OF THE INVENTION

The object of the present invention is to provide a process for producing uncrosslinked polypropylene-based resin foam sheets, which process enables to produce foam sheets having fine foam cells and good appearance and is excellent in productivity and extrusion stability as well as in productivity improving effect in the production of high-expansion thin sheets and which process reduces wavy or corrugated defects at the ends of sheets, and to provide uncrosslinked polypropylene-based resin foam sheets.

The present inventors have made intense studies in order to solve the above-described problems in the production of uncrosslinked polypropylene-based resin foam sheets by interposing a gear pump between an extruder and a die. Specifically, they examined the relationship among the variables, namely the pressure ($P_g$) at the inlet of the gear pump, the theoretical expansion ratio $\chi$ (theoretical expansion ratio based on the amount added of a foaming agent) when the foaming agent added is 100% held, and the coefficient of solubility H of the foaming gas in the molten resin. As a result, they found that it is possible to control the resin temperature within a range suited for foaming, to produce fine foam cells having good appearance, and to secure high productivity and extrusion stability if the above-mentioned variables are set within a specific relationship.

Accordingly, the present invention provides;
1. A process for producing uncrosslinked polypropylene-based resin foam sheets which is characterized by using an extrusion foaming apparatus having a gear pump which is interposed between the extruder and the die and which is linked by means of adapters, wherein the pressure ($P_g$) at the inlet of the gear pump is within the range specified by the following formula (Formula 1) and the extruder is controlled so that the value of $P_g$ is constant.

Formula 1

$$P_c \leq P_g(atm) \leq P_c + 90$$

$$P_C = (\chi - 1)/H$$

$\chi$: theoretical expansion ratio when the foaming agent added is 100% held
H: coefficient of solubility of the foaming gas in the resin at the resin temperature in the gear pump inlet ($cm^3$(STP)/$cm^3 \cdot atm$)
2. A process for producing uncrosslinked polypropylene-based resin foam sheets according to above 1, wherein the die is characterized by $5 \leq L/t \leq 12$ where L (mm) stands for the length of lip land and t (mm) stands for the lip gap.
3. A process for producing uncrosslinked polypropylene-based resin foam sheets according to above 1 or 2, wherein the extruding apparatus is characterized by $\frac{1}{4} \leq A/B \leq 1$ and $C/A \leq 10$ where the B (mm) stands for the barrel diameter, C (mm) stands for the length of the adapter, and A (mm) stands for the adapter diameter.
4. The uncrosslinked polypropylene-based resin foam sheet produced by a process described in any one of above 1 to 3.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Pc indicates a minimum pressure needed for dissolving the foaming gas in an amount corresponding to a predetermined expansion ratio. If the pressure Pg at the inlet of the gear pump is smaller than Pc, the foaming gas is not fully dissolved in the resin and therefore a gaseous phase is separated from the molten liquid phase. As a result, it is difficult to obtain a foam sheet having fine foam cells. On the other hand, if Pg is greater than (Pc+90), one of the important effects of the gear pump, namely the suppression of pressure rise in the extruder, is diminished. As a result, the purposes of preventing rise in resin temperature and enhancing productivity are adversely affected.

The extruder side is controlled so that the pressure Pg at the inlet of the gear pump is within the range of Pc$\leq$Pg (atm)$\leq$Pc+90 and so that Pg is constant. For making Pg constant, known controlling systems may be advantageously employed.

For example, feedback is made to the number of revolution of extruder screw or to the number of revolution of a metering feeder for charging raw materials to the hopper of the extruder. By this adjustment, since the pressure at outlet of the gear pump, the pressure at inlet of die, and the like are stabilized, the precision of thickness of the foam sheets in the direction of flow can be increased.

In the present invention, the above-mentioned die is preferably specified by 0$\leq$L/t$\leq$12, and more preferably specified by 5$\leq$L/t$\leq$12 where L (mm) stands for the length of lip land and t (mm) stands for the lip gap. In addition, a preferable condition for the extruding apparatus is ¼$\leq$A/B$\leq$1 and C/A$\leq$10 where B (mm) stands for barrel diameter, C (mm) stands for the length of the adapter, and A (mm) stands for the adapter diameter.

The above-described construction is intended for the optimization of the shape of lip portion of the die and the shape of the adapter. Therefore, the fulfillment of the above-described condition makes it possible to reduce the pressure loss in the region subsequent to the gear pump and in particular to advantageously inhibit the rise in resin pressure and resin temperature. As a result, the productivity in the production of high-expansion thin sheets can be secured.

In the production of high-expansion thin sheets, although the reduction of thickness may be possible by pulling down, the adoption of pulling down tends to produce sheets exhibiting undesirably poor appearance. As a normally employed practice, forming is conducted by use of a narrow lip gap set to the thickness of the product. However, the narrowing of the lip gap disadvantageously increases the pressure loss in the region subsequent to the gear pump to the extent that the heat generation and rise in resin temperature become conspicuous in that region even if Pg is controlled within a low pressure range of Pc$\leq$Pg (atm)$\leq$Pc+90 and the rise in resin temperature at a high delivery rate is inhibited in the region precedent to the gear pump.

In order to maintain the thickness of the product and to reduce the pressure loss in the lip portion, it is preferable to maintain the condition of by 0$\leq$L/t$\leq$12 and more preferable to maintain the condition of by 5$\leq$L/t$\leq$12 where L (mm) stands for the length of lip land and t (mm) stands for the lip gap.

If L/t is smaller than 5, the effect of narrowing the lip gap t is neither sufficientlor fully obtained, and the product becomes thick. On the other hand, if L/t is greater than 12, the reduction of pressure in the lip portion is not effectively realized.

Adjustment of the diameters and lengths of the adapters that precede or succeed the gear pump makes it possible to further reduce the pressure loss. It is preferable that the diameter A (mm) of each of the adapters preceding or succeeding the gear pump is large enough in relation to the extruder barrel diameter B (mm) to fulfill the relationship of ¼$\leq$A/B $\leq$1 and the ratio between the diameter A and the length of the adapter C is in a range of C/A$\leq$10.

The above-described specification of the ranges of L/t, A/B, and C/A constitute the invention related to the reduction of the pressure loss. Particularly when producing thin sheets by narrowing the lip gap, the increase of pressure loss directly influences the appearance of the products and the appearance quality tends to become worse. By specifying the ranges of L/t, A/B, and C/A as described above, it is possible to obtain products exhibiting good appearance even in the case where increase of pressure loss is likely to produce rejects. The lip gap, at which the pressure loss directly influences the appearance of the products, is about 0.8 mm.

Also preferred is a mode in which the adapter is shaped such that the pressure loss is reduced as described above and in which a static mixer or the like is installed in the adapter to cause the replacement or mixing between the region adjacent to the pipe wall and the central region of the adapter pipe to thereby improve the uniformity of temperature distribution.

The tip portion of a die, which is used for the extrusion forming of a resin, is called a lip and the gap in the die, which determines the thickness of a sheet product, is lip gap t. Examples of lip land length L and lip gap t and an example of the shape of die are shown in FIG. 1.

The present invention also relates to the uncrosslinked polypropylene-based resin foam sheet produced by any one of the processes described in claims 1 to 3. The uncrosslinked polypropylene-based resin foam sheet is characterized by fineness of foam cell voids and good appearance and also by slightness of the wavy or corrugated defective portions at the ends of the sheet.

DETAILED DESCRIPTION OF THE INVENTION

Figure 1:
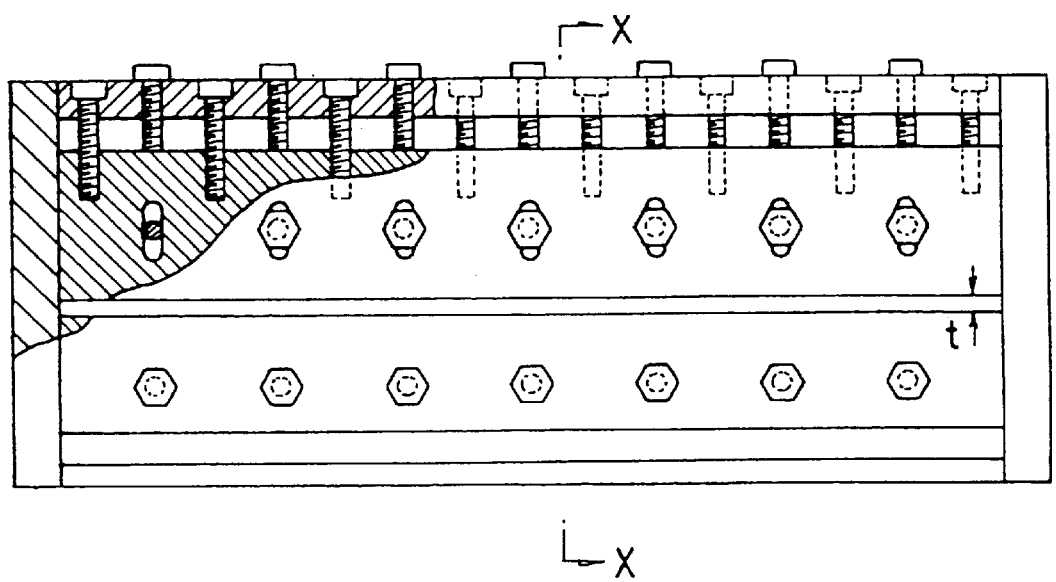
FIG. 1 illustrates (i) an example of the shape of die to be used in the present invention and (ii) the shape at outlet side thereof in the cross-section X—X.
Figure 1:
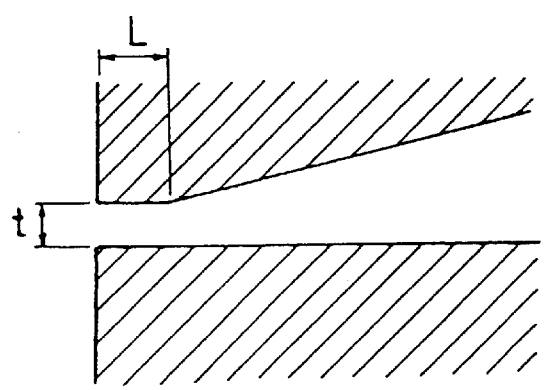

Except for the use of a gear pump as described above, known extrusion foaming processes can be used without particular limitations in the present invention.

Examples of the extrusion foaming process may include a process comprising the steps of charging a mixture of essential components such as a thermally decomposable foaming agent, a polypropylene resin, and others into a hopper, allowing the resin to melt and the foaming agent to decompose and blending/dispersing the resin and the foaming gas in the extruder, cooling the mixture to a temperature suitable for foaming, extruding the mixture from the die to allow the mixture to be foamed, and cooling/forming the extrudate by a pulling device; and a process comprising the same steps as described above except that an undecomposable foaming agent (a physically foaming gas) is press-fed into a section midway of the extruder in place of the use of the thermally decomposable foaming agent.

In the present invention, the polypropylene-based resin as a material constituting the foam sheet is not particularly limited and can be selected according to the applications of the products. The polypropylene may be a homopolymer of propylene or a copolymer of propylene with an α-olefin such as ethylene and the like. Also usable is a blend containing a polyethylene-based resin, a polystyrene-based resin, and the like.

In the present invention, the foaming agent is not particularly limited and a foaming agent hitherto known as that for a thermoplastic resin can be used. Specific examples of the foaming agent may include a thermally decomposable foaming agent such as sodium bicarbonate, azodicarbonamide, and the like; an inert gas such as carbon dioxide, nitrogen, and the like; an organic compound having a low boiling point such as butane and the like. These compounds may be used in a combination of two or more of them. The addition of an inorganic filler such as talc, silica, and the like as a nucleating agent for forming foam cells is also suitable.

It should be noted that the coefficient of solubility of the gas, which finally contributes to the foaming, is preferably large regardless of the types of the foaming agent, namely a thermally decomposable type or an undecomposable type. Because of its safety and relatively large coefficient of solubility, carbon dioxide is preferably used. An aliphatic hydrocarbon such as butane has a larger coefficient of solubility relative to carbon dioxide and is preferable in this regard as a foaming agent. However, the use of such hydrocarbon requires explosion-proof equipment and a safety measure.

Although the density of the foam sheet is not particularly limited, it is generally determined by the amount of the foaming agent and is in a range of from 0.6 to 0.09 g/cm$^3$. Although the thickness of the foam sheet obtained in the present invention is not particularly limited, it is normally in a range of from 1 to 30 mm. The thickness of the foam sheet is determined by the factors such as size of the lip gap t, expansion ratio which is adjusted by the amount of the foaming agent and the like, and oblateness of the foam cells, and the like.

The extruder for use in the present invention is not particularly limited and an extruder hitherto known as that for a thermoplastic resin can be used. However, it is necessary for the extruder to sufficiently blend a resin and a foaming gas in order to homogenize them and thereafter to cool/adjust the temperature thereof to a temperature suited for foaming. Therefore, the following types of extruders are preferably used in the present invention. Single-screw extruder This is an extruder most generally employed. This extruder is widely used because the foaming gas is not leaked from the inlet of raw materials (hopper) and the extruder is not expensive.
Multiple-screw Extruder Generally used is a twin-screw extruder. Examples of the twin-screw extruder include an extruder in which the screws rotate in the same direction and an extruder in which the screws rotate in different directions. Examples of the twin-screw extruder further include an extruder in which the screws are parallel to each other and the screw diameters are constant and an extruder with inclined screws in which the screw diameters dwindle toward the tip. If a twin-screw extruder is used in the present invention, it is preferable to provide a sealing segment because the foaming gas tends to leak from the twin-screw extruder.

Besides the above-mentioned extruders, also usable is, for example, a tandem extruder made by combining two or more of the above-mentioned extruders.

Examples of the die for use in the present invention include a flat die and a circular die. The lip gap t at the tip of die may be set in accordance with the desired thickness of the product.

A gear pump for use in the present invention is interposed between the extruder and the die and linked thereto by means of adapters. The gear pump to be used in the present invention is a pump designed to deliver a constant amount of molten resin by means of teeth of gears which rotate in an intermeshing relationship. The gear pump is selected from known gear pumps according to the capacity to meet the target production amount. Since a high-speed rotation is necessary and there alises a concern about heat generation if the delivery rate per revolution of the pump is small, it is preferable to select a gear pump having a capacity sufficient to deliver the target amount of production by a proper number of revolution. Further, it is preferable to cool or adjust the temperature of the body of the gear pump by means of adjustment of oil temperature or the like.

Although the coefficient of solubility H of the foaming gas in the molten resin can be measured by a pressure depression method, it can also be obtained by a method described in literature such as [AlChE J., 15, 106 (1969)].

As stated previously, the foaming agent suited for use in the present invention is carbon dioxide. The temperature dependence of the coefficient of solubility H of carbon dioxide in a molten polypropylene-based resin is given below (Formula 3). Although the dependence on temperature is slight, the coefficient of solubility H becomes smaller as the temperature becomes higher.

Formula 3

$$H = H_0 \exp(-Es/RT)$$

$H_0$: constant (0.0319 cm$^3$(STP)/cm$^3$·atm)
Es: Energy of dissolution (−1.7 kcal/mol)
R: Gas constant (1.986 cal/mol·K)
T: Temperature (K)
(The figures in brackets refer to values for carbon dioxide.)

EXAMPLES

In order to further explain the present invention in more details, the following examples are given, it being understood, however that the same are intended only as illustrative and in no wise limitative without departure from the spirit of the present invention.

Example 1

A single-screw extruder (barrel diameter B: 120 mm, effective screw length/barrel diameter: 32) was used as an extruder.

A coat hanger die with a choke bar having a width of 1150 mm was used as a die. The lip land length L was 7 mm, the lip gap t was 1.0 mm, and the ratio L/t was set to 7. A gear pump, body temperature of which was adjustable by oil and which had a delivery rate per revolution of 315 cm$^3$, was used. The control system employed was a system which set the pressure Pg at the inlet of the gear pump and provided feedback to the number of revolution of screw so that a constant value of Pg was maintained.

Adapters that preceded or succeeded the gear pump each had a diameter A of 40 mm and a length C of 240 mm (A/B=⅓, C/A=6). A polished roll unit complising 3 rolls each having a face length of 1200 mm and a diameter of 400 mm and a temperature adjusted in a range of from 60 to 100° C. was used as a pulling device.

As a polypropylene-based resin, a propylene homopolymer having a density of 0.9 g/cm$^3$ (having a melt flow rate (MFR) of 8 at 230° C.) was used. A pellet-blended mixture comprising 100 parts by weight of the propylene homopolymer and 1.5 parts by weight of a masterbatch containing 40% by weight of talc as a nucleating agent of foam cells was charged into a hopper. Carbon dioxide was used as a foaming agent. The foaming agent in an amount, which should provide a theoretical expansion ratio χ corresponding to 3-fold expansion, was press-fed at a pressure of about 100 atm from a port provided in a section midway of the extruder.

According to the extruding conditions described later, the resin temperature Tg in the central portion of adapter diameter at the inlet of the gear pump was about 185° C. When calculated by using values described in literature [AlChE J., 15, 106 (1969)] according to the aforedescribed formula (3), H=0.207 (cm$^3$(STP)/cm$^3$·atm) is obtained. Based on this, since Pc=(χ−1)/H=9.7 atm, the pressure Pg at the inlet of the gear pump was set to a low pressure of 15 atm within the range of Pc≦Pg (atm)≦Pc+90. The figures in brackets described previously to explain symbols of the formula (3) were used as data for carbon dioxide.

Besides, Tg, the resin temperature (K) in the central portion of adapter diameter at the inlet of the gear pump, was Tg (° C.)+273.15=185+273.15=458.15.

Operational conditions of the extruder were as follows. The screw revolution number was about 50 rpm (varied due to Pg control). The revolution number of the gear pump was 18 rpm. The delivery rate was 250 kg/hr which was a high delivery rate. As for the temperature, carbon dioxide was uniformly dissolved in the resin at 190 to 200° C., and the temperature in the regions ranging from metering section of screw to adapter and gear pump was set to 165 to 170° C. After being cooled, the blend was introduced into a die kept at a temperature of 170° C.

The extruded foam sheet had an apparent density 0.31 g/cm$^3$ (expansion ratio=0.9/0.31=2.9 times) and an average thickness of 5.0 mm. The foam cells were fine and the appearance was good. The total of right and left wavy or corrugated loss at the ends of sheets was as small as 150 mm. The width of the die used was 1150 mm and the loss rate was about 13%.

Examples 2 and 3 and Comparative Examples 1 and 2

Foam sheets were produced by using the same resin and extruder as in Example 1 but by changing the conditions such as the resin pressure Pg at the inlet of the gear pump, the lip land length L, the lip gap t, the adapter diameter A, and the adapter length C. The production conditions are shown in Table I and the evaluation results of the foam sheets are shown in Table 2.

When foamed sheets are produced from a polypropylene-based resin which has suitable foaming temperature only at a low temperature within a limited range and when an extruder belonging to the class employed in the foregoing examples is used without the use of a gear pump, a delivery rate of 150 to 200 kg/hr is an upper limit and therefore extrusion at a delivery rate higher than this range does not provide a proper foamed sheet because the resin temperature tends to rise by the heat generated by shearing. Based on the results of the examples described above, the effect of using the gear pump according to the present invention is apparent.

TABLE 1

[Production conditions]

| | Inlet of gear pump | | | Shape of die lip | | | Shape of adapter | | | |
|---|---|---|---|---|---|---|---|---|---|---|
| | Resin pressure Pg (arm) | Resin temperature Tg (° C.) | Coefficient of dissolution H (*) | Pc (atm) | Land length L (mm) | Gap t (mm) | L/t | Adapter diameter A (mm) | Adapter length C (mm) | A/B | C/A |
| Example 1 | 15 | 185 | 0.207 | 9.7 | 7.0 | 1.0 | 7 | 40 | 240 | 0.33 | 6 |
| Example 2 | 80 | 185 | 0.207 | 9.7 | 7.0 | 1.0 | 7 | 40 | 240 | 0.33 | 6 |
| Example 3 | 15 | 185 | 0.207 | 9.7 | 4.0 | 0.5 | 8 | 60 | 240 | 0.50 | 4 |
| Comparative Example 1 | 140 | 189 | 0.203 | 9.8 | 7.0 | 1.0 | 7 | 40 | 240 | 0.33 | 6 |
| Comparative Example 2 | 5 | 185 | 0.207 | 9.7 | 7.0 | 1.0 | 7 | 40 | 240 | 0.33 | 6 |

(*) Unit: cm$^3$ (STP)/cm$^3$ · atm

TABLE 2

[Evaluation results]

| | Expansion ratio | Thickness of sheet (mm) | Length of wavy or corrugated loss (mm) | Rating of appearance and shape of foam cells |
|---|---|---|---|---|
| Example 1 | 2.9 | 5.0 | 150 | ○ |
| Example 2 | 2.9 | 5.0 | 150 | ○ |

TABLE 2-continued

[Evaluation results]

| | Expansion ratio | Thickness of sheet (mm) | Length of wavy or corrugated loss (mm) | Rating of appearance and shape of foam cells |
|---|---|---|---|---|
| Example 3 | 2.9 | 2.5 | 150 | ○ |
| Comparative Example 1 | 2.3 | 4.0 | 500 | X |
| Comparative Example 2 | 2.9 | 5.0 | 150 | X (Presence of coarse cells) |

The present invention makes it possible to produce uncrosslinked polypropylene-based resin foam sheets having fine foam cells and good appearance and being excellent in productivity and extrusion stability as well as in productivity improving effect in the production of high-expansion thin sheets with reducing wavy or corrugated defects at ends of sheets.

Explanation of Letters and Numerals

1: die
L: length of lip land
t: lip cap

What is claimed is:

1. A process for producing uncrosslinked polypropylene-based resin foam sheets which is characterized by using an extrusion foaming apparatus having an extruder, a die and a gear pump, wherein the gear pump is interposed between the extruder and the die and is linked by means of adapters, wherein the extrusion foaming apparatus has at least one kind of means for reduction of pressure loss, said means comprising said die or said extruder in which the die in the means has a form specified by $5 \leq L/t \leq 12$ where L (mm) stands for the length of lip land and t (mm) stands for the lip gap or in which the extruder in the means has a form specified by $1/4 \leq A/B \leq 1$ and $C/A \leq 10$ where B (mm) stands for the barrel diameter, C (mm) stands for the length of the adapter, and A (mm) stands for the adapter diameter, wherein a pressure (Pg) at the inlet of the gear pump is within a range specified by the following Formula 1 and the extruder is controlled so that the value of Pg is constant:

Formula 1:

$$Pc \leq Pg(atm) \leq Pc+90$$

$$Pc=(\chi-1)/H$$

$\chi$: theoretical expansion ratio when the foaming agent added is 100% held

H: coefficient of solubility of the foaming gas in the resin at the resin temperature in the gear pump inlet $(cm^3(STP)/cm^3 \cdot atm)$.

2. A process for producing uncrosslinked polypropylene-based resin foam sheets which is characterized by using an extrusion foaming apparatus having an extruder, a die and a gear pump, wherein the gear pump is interposed between the extruder and the die and is linked by means of adapters, wherein the extrusion foaming apparatus has two kinds of means for reduction of pressure loss, said means comprising said die and said extruder in which the die in the means has a form specified by $5 \leq L/t \leq 12$ where L (mm) stands for the length of lip land and t (mm) stands for the lip gap and in which the extruder in the means has a form specified by $1/4 \leq A/B \leq 1$ and $C/A \leq 10$ where B (mm) stands for the barrel diameter, C (mm) stands for the length of the adapter, and A (mm) stands for the adapter diameter, wherein a pressure (Pg) at the inlet of the gear pump is within a range specified by the following Formula 1 and the extruder is controlled so that the value of Pg is constant:

Formula 1:

$$Pc \leq Pg(atm) \leq Pc+90$$

$$Pc=(\chi-1)/H$$

$\chi$: theoretical expansion ratio when the foaming agent added is 100% held

H: coefficient of solubility of the foaming gas in the resin at the resin temperature in the gear pump inlet $(cm:^3(STP)/cm^3 \cdot atm)$.

3. A method for reducing a loss due to wavy defects at ends of uncrosslinked polypropylene-based resin foam sheets, which comprises applying both of a first means for producing fine foam cell voids and a second means for reducing a pressure loss to an extrusion foaming apparatus, to be used in the production of the sheets, having a extruder, a die and a gear pump, wherein the first means is a means to control the extruder so that the value of Pg is constant while satisfying a pressure (Pg) at the inlet of the gear pump within a range specified by the following formula Formula 1:

Formula 1:

$$Pc \leq Pg(atm) \leq Pc+90$$

$$Pc=(\chi-1)/H$$

$\chi$: theoretical expansion ratio when the foaming agent added is 100% held

H: coefficient of solubility of the foaming gas in the resin at the resin temperature in the gear pump inlet $(cm:^3(STP)/cm^3 \cdot atm)$ and the second means is a means comprising said die or said extruder in which the die in the means has a form specified by $5 \leq L/t \leq 12$ where L (mm) stands for the length of lip land and t (mm) stands for the lip gap or in which the extruder in the means has a form specified by $1/4 \leq A/B \leq 1$ and $C/A \leq 10$ where B (mm) stands for the barrel diameter, C (mm) stands for the length of the adapter, and A (mm) stands for the adapter diameter.

* * * * *